April 18, 1961     J. PIROUX     2,980,748
SEALED ALKALINE ACCUMULATOR
Filed Aug. 6, 1959
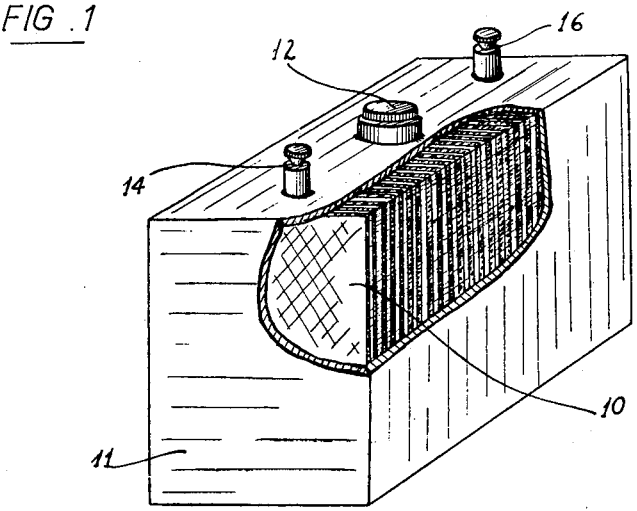
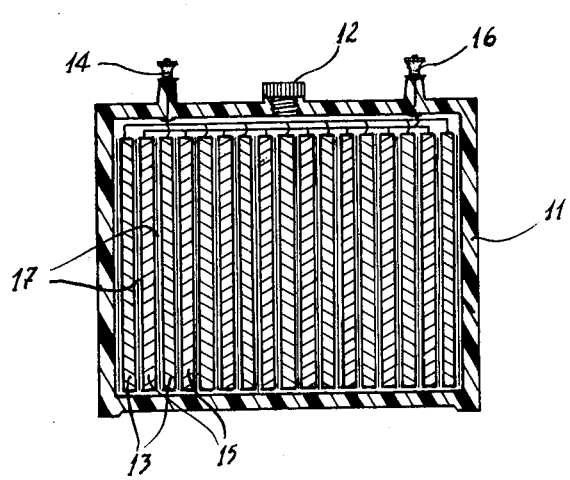
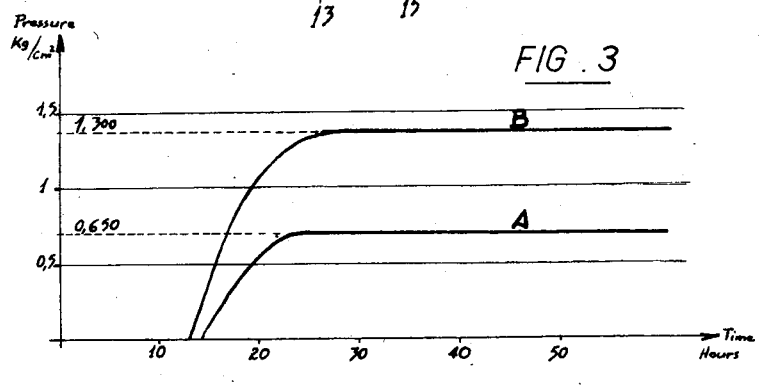
INVENTOR
JEAN PIROUX
By Irwin S. Thompson
ATTY.

United States Patent Office 2,980,748
Patented Apr. 18, 1961

2,980,748

SEALED ALKALINE ACCUMULATOR

Jean Piroux, 18 Blvd. Gallieni, Villemomble, France

Filed Aug. 6, 1959, Ser. No. 831,957

Claims priority, application France July 26, 1955

4 Claims. (Cl. 136—29)

The present application is the continuation in part of my co-pending application Serial No. 599,750 filed on July 24, 1956, now abandoned, and has for its object a sealed alkaline accumulator adapted to avoid the evolution of gas during successive charging periods.

It is in fact known that the chief difficulty in the construction of sealed accumulators is the danger of evolution of gas which cannot be controlled and which creates over-pressures in the hermetically sealed container, with the result that the over-pressures in question often cause the container to burst.

In order to overcome this disadvantage, I have already suggested in my Patent No. 2,855,451 a means of proceeding to evacuate at the end of the charging period the electrolyte which remains in the form of a liquid. By this means, dangerous evolution of gas is avoided and the pressure is stabilized at a value which is acceptable for the strength of the container and which remains constant even after a large number of successive charges and discharges.

I have found that the value of the internal pressure of the accumulator could be still further reduced until such time as the said pressure is stabilized at a very small value without involving the least risk, by substantially reducing the density of the electrolyte. Making use of an alkaline electrolyte in which the electrolyte is potash, the usual density being 24 to 28 degrees Baumé, I reduce this density to 10 to 20° Baumé, and preferably 15° Baumé.

Experience shows that, when thus provided with a low density electrolyte and after the evacuation of the excess electrolyte at the end of the charging period, the alkaline accumulator not only serves to avoid all undesirable evolution of gas, even in the event of accidental overload, but does not, moreover, give rise to any reduction of capacity even after a great number of repeated charges and discharges.

The present invention will be more fully described with reference to the accompanying drawings, in which:

Fig. 1 is a view in perspective of the accumulator, a portion of the container being broken away so as to show the active elements.

Fig. 2 is a longitudinal cross-section of the accumulator of Fig. 1.

Fig. 3 is an explanatory diagram giving the value of the internal pressure as a function of the duration of the charging period.

The sealed alkaline accumulator is constituted by an element 10 arranged in a fluid-tight container 11 comprising simply an opening which is closed by a stopper 12, which is fastened hermetically after the initial charge.

The element 10 is constituted by a succession of alternately arranged positive and negative plates. The positive plates 13 are formed from a support of nickel which is impregnated or coated with cadmium hydrate. They are connected to the terminal 16. Between the positive plates 13 and the negative plates 15 are interposed separators 17 of synthetic fiber fabric, in particular polyamide (nylon) having a thickness of 0.17 millimeter.

The accumulator which is thus constituted, after being filled with electrolyte, is hermetically sealed by locking the stopper 12. This accumulator can thus be used without danger in confined spaces, mines, etc.

Accumulators of this type are usually filled with electrolyte consisting of potash at 24–28° Baumé, as this density appears to be necessary in order to obtain a good capacity of the accumulator in ampere-hours.

I have found that by employing potash at 10–20 degrees Baumé, thus obtaining a much lower density, without appreciably reducing the capacity of the accumulator, this results in the advantage that the charge pressure is stabilized at a small value and without danger.

The accumulator is constructed as described in my Patent No. 2,855,451. The formation charge is carried out by placing the accumulator in an inverted position, the orifice of the stopper 12 being directed downwards. The accumulator is then connected to a source of current which ensures its electric formation. The excess of electrolyte is expelled out of the container and is unretained by the element 10 at the end of the charging period when the evolution of gas begins. The container is then closed in a fluid-tight manner after completion of expulsion of the excess of electrolyte. In this manner, the potash which remains in a liquid state at the end of the charging period is evacuated. The liquid which impregnates the separators 17 is initially retained therein by capillarity and at the end of the charging period forced back by the conversion of the electrolyte into a gas which remains enclosed in the separator and in the active material of the plates 13 and 15. It is in this state that the stopper 12 is hermetically sealed, and the accumulator is made fluid-tight.

An accumulator of this type having the usual density potash of 24° Baumé, gives rise to a production of gas starting from the fifteenth hour of the charging period. The pressure of this gas increases until it is stabilized at a value of 1,300 kg. per sq. cm. as shown in the curve B of Fig. 3.

If on the contrary, the density of the potash is reduced to 15°, in accordance with my suggestion, the evolution of gas follows the curve A, which shows a stabilization of the pressure at 0.650 kg., per sq. cm. This represents a very considerable advantage both from the point of view of the strength of the container 11 and from the point of view of the life of the accumulator. The capacity of the accumulator is 10 ampere-hours; this capacity remains constant after a large number of charge-discharge cycles.

What I claim is:

1. A method of manufacture for a fluid-tight electric accumulator of the nickel-cadmium type comprising a fluid-tight container having a block constituted by a stack of plate electrodes and thin separators, the said method consisting in filling the said container with electrolyte composed of potash having a density of 10 to 20° Baumé in sufficient quantity to saturate the block of electrodes and separators, then inverting the position of the container and connecting the accumulator to a source of current which ensures its electric formation, and in expelling out of the container the excess of electrolyte which is unretained by the block at the end of the charging period when the evolution of gas begins, and closing said container in a fluid-tight manner after completion of the expulsion of the excess of electrolyte.

2. In a method of manufacturing a fluid-tight electric accumulator of the nickel-cadmium type comprising a container having a plurality of adjacent electrode plates and separators, the steps of impregnating said separators and plates with electrolyte composed of potash having a density of 10 to 20° Baumé, connecting the accumulator to a source of current which insures electric formation thereof, discharging from the container the excess of electrolyte liquid non-absorbed by the separators and plates when the evolution of gas has begun during the initial formation charge, and of closing said accumulator in a fluid-tight manner only when said discharge has been completed.

3. A method of manufacture according to claim 1 in which the density of said electrolyte is 15° Baumé.

4. In a method of manufacturing according to claim 2 wherein the density of said electrolyte is 15° Baumé.

References Cited in the file of this patent
UNITED STATES PATENTS

| | | |
|---|---|---|
| 2,642,469 | Gary | June 16, 1953 |
| 2,646,455 | Jeannin | July 21, 1953 |
| 2,855,451 | Piroux | Oct. 7, 1958 |